CURED RESIN FROM SOLUTION OF COPOLYMER OF MALEIC
ANHYDRIDE AND A STRAIGHT CHAIN OLEFIN, A LIQUID
MONOOXIRANE COMPOUND AND A CYCLIC MONOANHYDRIDE HAVING
4 OR 5 CARBON ATOMS IN THE ANHYDRIDE RING
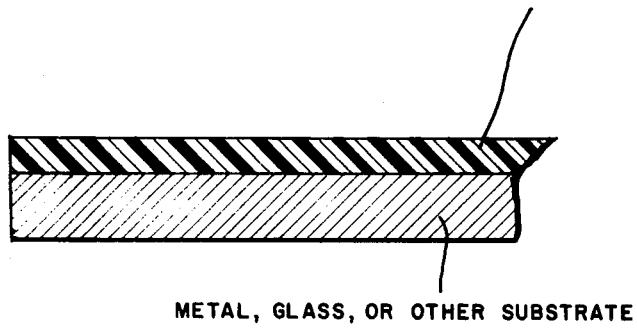
METAL, GLASS, OR OTHER SUBSTRATE
INVENTORS
STANLEY M. HAZEN &
WILLIAM J. HEILMAN
BY
ATTORNEY United States Patent Office 3,579,487
Patented May 18, 1971

3,579,487
POLYANHYDRIDE-MONOEPOXIDE COMPOSITIONS CONTAINING A MONOANHYDRIDE
Stanley M. Hazen, Cheswick, and William J. Heilman, Allison Park, Pa., assignors to Gulf Research & Development Company, Pittsburgh, Pa.
Filed Oct. 19, 1967, Ser. No. 676,408
Int. Cl. C08f 15/00
U.S. Cl. 260—78.5T
7 Claims

ABSTRACT OF THE DISCLOSURE

Liquid coating and molding compositions are provided which are curable to an infusible resin article or coating. The composition comprises a solution of a saturated or unsaturated monooxirane compound, for example epichlorohydrin, a monoanhydride of a dicarboxylic acid containing at least 5 carbon atoms, such as phthalic anhydride and a solid polyanhydride having succinic anhydride groups (excluding aromatic anhydrides in which the α-carbon atoms of the anhydride group are included in the aromatic ring) for example the copolymer of a straight chain α-monoolefin and a maleic anhydride. Preferably a tertiary amine, such as 3-picoline, is included as a cure accelerator. The composition shows little or no shrinkage and weight loss during curing, in contrast to the same composition minus the mono-anhydride. Thus for example, films and coatings free of lifting and etching are obtained.

---

This invention relates to new compositions capable of being cured to solid infusible resins having excellent physical and chemical properties.

Of the many types of resinous compositions in the art, the epoxy resins, obtained by cross-linking of polyepoxide compounds with various cross-linking agents, have received a substantial amount of attention from those working in the art, as have resins prepared from reactants including dianhydrides and monoepoxy compounds. In many ultimate applications of resins, such as in coating, casting, potting, laminating, adhering objects together, encapsulating, and filament winding it is important that the materials have good curing properties and the final products must have the desired physical and chemical characteristics. Thus, during curing, it is important that little or no shrinkage takes place, particularly for coatings and molded resins. Another disadvantage which may appear is a loss in weight during curing, apparently due to volatilization of ingredients. Other important characteristics are flexural strength and toughness such as impact resistance, or hardness and rigidity where these are required, heat distortion temperature, rapid curing, smoothness and clarity of films, dimensional uniformity of the end cured product, and good adhesion and these properties are often required. The reaction of a solution of a liquid monooxirane compound with a solid polyanhydride (where the anhydride groups are not directly attached to and form part of an aromatic ring) such as a polyanhydride prepared by the copolymerization of an α-olefin and maleic anhydride, gives resins which have many of the foregoing properties, but which are deficient in some regards. For example, shrinkage with or without concurrent weight loss during curing may create built-in undesirable stresses, resulting in such defects as warping, and etching and lifting in the case of films or coatings.

It has now been found that the inclusion of a monoanhydride of a dicarboxylic acid having at least 5 carbon atoms, dissolved in the monooxirane compound-polyanhydride solution, unexpectedly gives products having improved physical and chemical properties, particularly in providing products which show reduced weight loss during curing, which do not change shape or shrink during curing of the resin, with no adverse effect on other important properties. This improvement may be stated as being a new composition capable of being cured to a solid infusible state and comprising a liquid or spreadable solution of:

(A) A solid compound containing at least two succinic anhydride groups and less than three conjugated double bonds when one of the conjugated double bonds is between the carbon atoms alpha to the carbonyl groups in a succinic anhydride group;

(B) A saturated or olefinically unsaturated monooxirane compound containing as its only functional group, in addition to an olefinic double bond if present, a single oxirane oxygen atom; and (C) A cyclic monoanhydride having at least 5 carbon atoms and having from 4 to 5 carbon atoms in the anhydride ring.

The ratio of the anhydride groups of (A) to the oxirane groups of (B) varies over a wide range, and the amount of (C) is a minor amount with regard to the combined weight of (A) and (B). A possible course of the resin forming reaction is illustrated by the following reaction of a hexene-1-maleic anhydride copolymer, epichlorohydrin and phthalic anhydride:

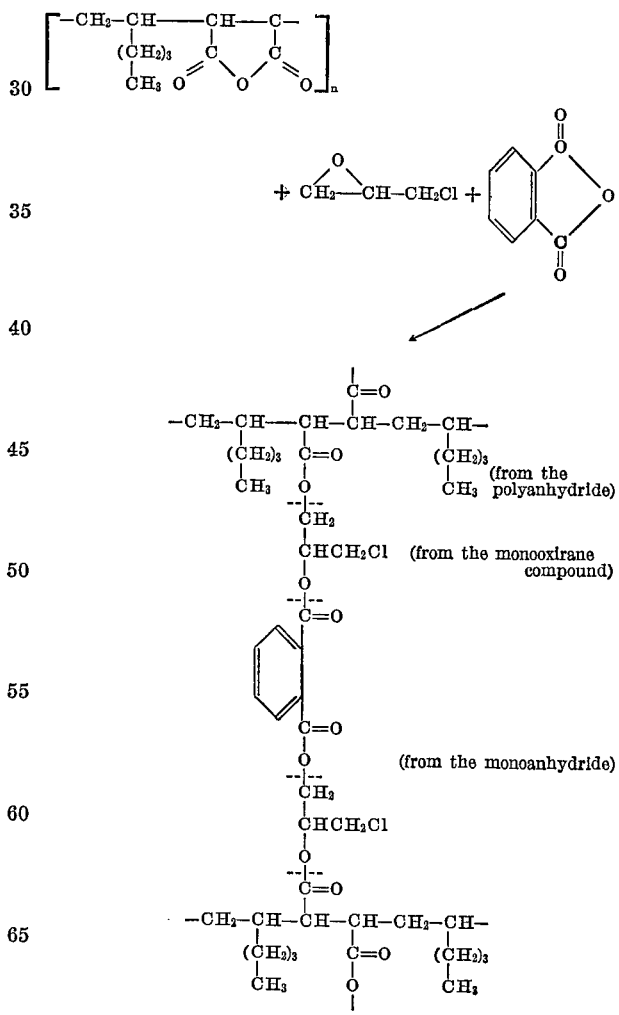

It is not intended that the invention be limited by the foregoing empirical formula of the polymer structure or by this hypothetical example of the reaction.

The drawing illustrates an embodiment of an article of manufacture comprising a substrate containing a cured coating of the solution of the invention.

One of the components of the composition of this invention is a solid compound containing at least two succinic anhydride groups and less than three conjugated double bonds when one of the conjugated double bonds is between the carbon atoms alpha to the carbonyl groups in a succinic anhydride group. In other words, one of the components of the compositions of this invention is a solid compound containing at least two anhydride groups where the carbon atoms alpha to the carbonyl groups in the anhydride are connected to each other through a bond selected from the group consisting of a single bond and a double bond and wherein said solid compound contains less than 3 conjugated double bonds when one of the conjugated double bonds is between the carbon atoms alpha to said carbonyl groups. By the term "conjugated double bonds" in this specification is meant conjugated carbon to carbon double bonds.

It is preferred that in the solid compound component containing at least two succinic anhydride groups, that the carbon atoms alpha to the carbonyl groups in the succinic anhydride be connected to each other through a single bond and that the molecule be free of olefinic or acetylenic unsaturation. At least two succinic anhydride groups are required to obtain proper crosslinking of the solid compound with the liquid monomeric organic oxirane compound to be defined below. In addition, the solid polyanhydride compounds are defined so as to exclude aromatic polyanhydrides where the carbon atoms alpha to the carbonyl groups in the anhydride group are a part of an aromatic ring. Such aromatic polyanhydrides have been found unsuitable to form the compositions of this invention as they are substantially insoluble in the liquid monomeric organic oxirane compound.

The solid polyanhydrides for use in the compositions of this invention can be prepared in any suitable manner. One suitable procedure is to polymerize an unsaturated derivative of succinic anhydride with an olefinic compound. By an unsaturated derivative of succinic anhydride is meant any organic compound comprising a succinic anhydride group and at least one carbon to carbon double bond. By a succinic anhydride group is meant the group represented by Formula I below:

Formula I

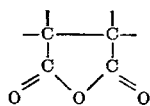

The carbon to carbon double bond can occur in the Formula I above between the carbon atoms alpha to the carbonyl groups in the succinic anhydride group or the carbon to carbon double bond can occur in the groups attached to the carbon atoms alpha to the carbonyl groups in the succinic anhydride group. For example, the solid polyhydrides can be prepared by the homopolymerization of succinic anhydride derivatives represented by the general Formulas II through VII below:

Formula II

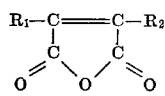

where $R_1$ is a member selected from the group consisting of hydrogen, halogen, a hydrocarbon radical and a substituted hydrocarbon radical; and $R_2$ is selected from the group consisting of hydrogen and halogen atoms. By the term "hydrocarbon radical" in this specification is meant any group of atoms consisting of carbon and hydrogen, such as alkyl, cycloalkyl, aryl, alkaryl, and aralkyl. Unless otherwise indicated, the term "alkyl" is meant to included only saturated groups. The term "hydrocarbon radical" is therefore intended to substantially exclude olefinic unsaturation in the radicals unless otherwise indicated. By the term "substituted hydrocarbon radical" in the specification is meant one where one or more atoms in the hydrocarbon radical have been exchanged for a halogen; —C≡N; —OR group where R is any hydrocarbon radical as defined above; or

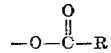

where R is any hydrocarbon radical as defined above. Examples of suitable polyanhydride precursors having the above formula are as follows:

maleic anhydride;
methylmaleic anhydride;
ethylmaleic anhydride;
hexylmaleic anhydride;
phenylmaleic anhydride;
benzylmaleic anhydride;
dibromomaleic anhydride;
cyanoethylmaleic anhydride;
chloromaleic anhydride;
pentadecylmaleic anhydride;
octacosylmaleic anhydride;
cyclohexylmaleic anhydride;
diphenylmaleic anhydride;
naphthylmaleic anhydride;
orthotolylmaleic anhydride;
bromochloromaleic anhydride;
4-propyl-8-methyl-eicosylmaleic anhydride;
4-propyl-1-naphthylmaleic anhydride;
4-cyclohexyltridecylmaleic anhydride;
paraethylphenylmaleic anhydride;
1-chloro-2-methylmaleic anhydride;
1-bromo-2-heptylmaleic anhydride;
1-chloro-2-heptadecylamaleic anhydride;
1-chloro-2-heptocosylmaleic anhydride;
1-chloro-2-cyclohexylmaleic anhydride;
1-bromo-2-phenylmaleic anhydride;
1-chloro-2-p-decylphenylmaleic anhydride;
1-chloro-2-heptylmaleic anhydride;
chloromethylmaleic anhydride;
3-bromooctylmaleic anhydride;
phenoxymethylmaleic anhydride;
phenoxydocosylmaleic anhydride;
6-pentanoxyoctylmaleic anhydride;
1-chloro-2(2-phenoxyethyl)maleic anhydride;
4-cyanononylmaleic anhydride; and
1-bromo-2-(3-cyanohexyl)maleic anhydride.

Formula III

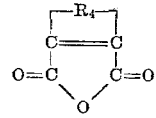

where $R_4$ is selected from the group consisting of a divalent hydrocarbon radical having between 2 and 5 cyclic carbon atoms and a substituted divalent hydrocarbon radical having between 2 and 5 cyclic carbon atoms. the total number of carbon atoms in $R_4$ can be between 3 and 36 and is preferably between 4 and 16. Examples of suitable polyanhydride precursors having the above Formula III are as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-4-octylcyclohexene anhydride;
1,2-dicarboxylic-5-octacosylcycloheptene anhydride;
1,2-dicarboxylic-5-cyanocyclohexene anhydride;
1,2-dicarboxylic-4-pentyl-5-octylcyclohexene anhydride; and 1,2-dicarboxylic-4(2-chloropentyl)-cyclohexene anhydride.

Formula IV

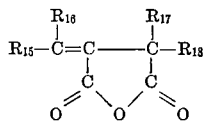

where $R_{15}$, $R_{16}$, $R_{17}$ and $R_{18}$ can be the same or different and are selected from the group consisting of hydrogen, halogen, a hydrocarbon radical and a substituted hydrocarbon radical. Examples of suitable polyanhydride precursors having the above Formula IV are as follows:

itaconic anhydride;
1,2-dicarboxylic-pentene-2-anhydride;
1,2-dicarboxylic-octene-2 anhydride;
1,2-dicarboxylic-tetradecene-2 anhydride;
1,2-dicarboxylic-eicosene-2-anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,1-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

Formula V

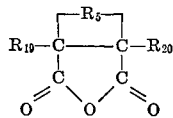

where $R_{19}$ and $R_{20}$ can be the same or different and are selected from the group consisting of hydrogen, halogen, a hydrocarbon radical, and a substituted hydrocarbon radical; and $R_5$ is a member selected from the group consisting of an unsaturated divalent hydrocarbon radical having between 3 and 5 carbon atoms wherein the unsaturation occurs between any two adjacent cyclic carbon atoms. The total number of carbon atoms in $R_5$ can be between 3 and 36 and is preferably between 4 and 10. Compounds having the structure according to Formula V above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula V. Examples of other suitable compounds for preparing the polyanhydrides having the above Formula V include:

bicyclo(2,2.1)5-heptene-2,3-dicarboxylic anhydride;
cis-4-cyclohexene-1,2-dicarboxylic anhydride;
7-oxabicyclo(2.2.1)5-heptene-2,3-dicarboxylic anhydride;
4-methyl-4-cyclohexene-1,2-dicarboxylic anhydride; and
2-styryl-5-phenyl-1-cyclohexene-3,4-dicarboxylic anhydride.

Formula VI

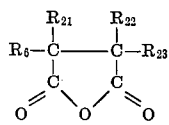

where $R_{21}$, $R_{22}$, and $R_{23}$ can be the same or different and are selected from the group consisting of hydrogen, halogen, a hydrocarbon radical, and a substituted hydrocarbon radical; and $R_6$ is a member selected from the group consisting of an unsaturated hydrocarbon radical and an unsaturated substituted hydrocarbon radical. Examples of suitable compounds suitable for preparing the solid polyanhydride having the above formula are as follows:

propenylsuccinic anhydride;
butenylsuccinic anhydride;
hexenylsuccinic anhydride;
isopropenylsuccinic anhydride;
octadecenylsuccinic anhydride;
dodecenylsuccinic anhydride;
eicosenylsuccinic anhydride;
octenylsuccinic anhydride;
1-dodecenyl-2-chlorosuccinic anhydride;
1,1-dipropyl-2-methyl-2-propenylsuccinic anhydride; and
1-octyl-1-bromo-2-butyl-2-dodecenylsuccinic anhydride.

Formula VII

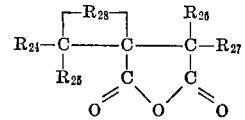

where $R_{24}$, $R_{25}$, $R_{26}$ and $R_{27}$ can be the same or different and are selected from the group consisting of hydrogen, halogen, a hydrocarbon radical and a substituted hydrocarbon radical; and $R_{28}$ is an unsaturated divalent hydrocarbon radical having four cyclic carbon atoms. The total number of carbon atoms in compounds having the formula VII above can be between 9 and 40 and is preferably between 9 and 16. These compounds can suitably be prepared by the Diels-Alder reaction between a conjugated diene and itaconic anhydrides.

In the compounds represented by Formulas II, IV, V, VI and VII above, where R, $R_1$, $R_2$, $R_6$ and $R_{15}$ through $R_{27}$ are selected from the group consisting of hydrocarbon and substituted hydrocarbon radicals, they can have between 1 and 30 and preferably between 1 and 15 carbon atoms. The total number of carbon atoms per molecule for any particular compound represented by Formulas II through VII can be between 4 and 40 and preferably between 4 and 20.

The solid polyanhydride can be prepared by the copolymerization of an unsaturated succinic anhydride compound such as defined above with certain organic monoolefinic compounds. For example, the unsaturated succinic anhydride compounds can be copolymerized with olefinic compounds as represented by the general Formula VIII below:

Formula VIII

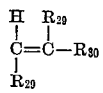

where $R_{29}$ is hydrogen or halogen and $R_{30}$ is a straight chain alkyl or halogenated alkyl radical having from 1 to about 14 carbon atoms, more preferably from 4 to bout 8 carbon atoms.

The preferred polyanhydrides or copolymers are those prepared by the copolymerization of maleic anhydride with an alpha-olefinic hydrocarbon having between 6 and 14 carbon atoms per molecule, preferably between 6 and 10 carbon atoms per molecule.

It is understood that the term "olefin" is meant to include mixtures of monoolefins such as those obtained by the thermal or catalytic cracking of petroleum stocks. It is desirable that only one olefinic bond per molecule be present in the anhydride or the olefin, since more than one double bond per molecule promotes gel formation and internal crosslinking. Minor amounts of diolefins, on the order of two percent or less, can, however, be tolerated in the anhydride and olefin.

Examples of olefin compounds or mixtures of olefins suitable to form the solid polyanhydride components of the compositions of this invention include:

1-hexene;
1-heptene;
1-octene;
1-nonene;
1-decene;
5-chlorohexene-1;
1-undecene;
1-dodecene;
1-tridecene; and
1-tetradecene.

One possible structure of the copolymer of hexene-1 and maleic anhydride is as follows:

Formula IX

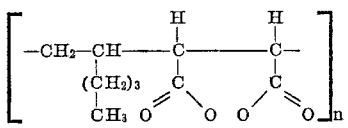

wherein $n$ is from 2 to about 100, or higher, and preferably from 2 to about 30. The foregoing assumes no additional polymerization of like monomers, which of course can take place with suitable monomers and conditions. It is to be understood that either or both of the terminal groups in the foregoing formula may be derived from any component of the reaction mixture.

A more general empirical formula, is as follows:

Formula X

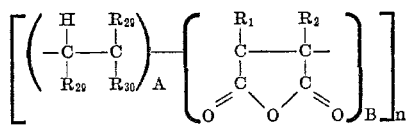

wherein $R_1$, $R_2$, $R_{29}$ and $R_{30}$ have the significance given above, $n$ is an intger of from 2 to about 100, A is from 1 to about 100, and B is from 1 to about 100 or more, preferably from 2 to about 30. It is to be understood that either or both of the terminal groups in the foregoing formula may be derived from any component of the reaction mixture.

In the copolymerization of the unsaturated succinic anhydride compounds with the olefin compounds as defined, at least two unsaturated succinic anhydride molecules must, of course, be incorporated in each polyanhydride molecule in order to produce a solid polyanhydride having at least two succinic anhydride groups therein.

The copolymerization can be conducted in any suitable manner. One suitable copolymerization procedure involves contacting the olefinic compound with the anhydride in a suitable solvent in the presence of a free radical producing catalyst, such as a peroxide. The ratio of the olefinic compound to the anhydride compound will depend to a large extent on the specific olefins and anhydrides employed. For example, for the copolymerization of aliphatic mono-alpha-olefins and maleic anhydride, the ratio of olefin to anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used in which case much lower temperatures, i.e., −80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reacting components. Suitable solvents include, for example:

| | |
|---|---|
| n-pentane; | cumene; |
| n-hexane; | xylene; |
| n-octane | ethyl-n-butyrate; |
| methylene chloride; | tetrachloroethylene; |
| tetrahydrofuran; | di-n-butylether; |
| di-isopropyl ether; | n-amylacetate; |
| carbon tetrachloride; | anisol; |
| cyclohexane; | cyclohexanone; |
| methylcyclohexane; | bromobenzene; |
| n-propylacetate; | methylorthotolylether; |
| toluene; | acetone; |
| benzene; | methylethylketone; and |
| ethylbenzene; | ethylbenzylether. |

The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobis-isobutyronitrile.

The molecular weight of the polyanhydride component of the compositions of this invention can vary over a wide range. The inherent viscosity (which is a measure of molecular weight) of five grams of the polyanhydride per deciliter of acetone at 77° F. can suitably be between about 0.01 and 2 or more, and is preferably between 0.02 and 0.95 deciliter per gram (ASTM Test D–1601 with changes noted above).

The composition of this invention also comprises a saturated or an olefinically unsaturated monooxirane compound containing as its only functional groups a single oxirane oxygen atom and optionally at least one olefinic double bond capable of being polymerized by free radical means. By a functional group is meant a group such as an oxirane oxygen atom which would participate in the anhydride-monoepoxide crosslinking reaction, i.e., combine chemically with the anhydride, such as for example —OH, —SH, and —NH groups. By an oxirane oxygen atom is meant an oxygen atom directly connected to two carbon atoms which carbon atoms are connected to each other, i.e.,

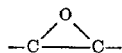

A monooxirane compound is frequently termed a monoepoxide. The monooxirane compound may also contain at least one, and preferably only one, olefinic double bond capable of being polymerized by free radical means. By free radical means in this application is meant thermal means, i.e., heat; ultraviolet light; radiation and well known free radical chemical initiators, such as organic peroxides, azo compounds, etc., as mentioned above. The liquid monooxirane compounds are preferred. Suitable ethylenically unsaturated monooxirane compounds are those which contain, in addition to the single oxirane oxygen, at least one terminal $CH_2=C<$ grouping.

The alpha-olefinically unsaturated monooxirane compounds contain substituents directly connected to the beta-carbon atom of the alpha olefin, which substituents result in a net electron withdrawal from the alpha olefin double bond. In other words, the alpha olefin double bond is activated for polymerization by substituents or groups which effect an electron withdrawal from the olefinic double bond. Electron withdrawing groups are well known in the art and include, for example, halogen;

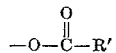

where R' is any organic radical; —C≡N; an aromatic organic radical;

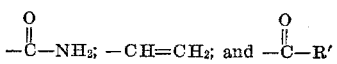

where R' is any organic radical. Substituents or groups which donate electrons are undesirable, but can be used if the net effect of the two substituents on the beta-carbon atom of the alpha olefin is to effect an electron withdrawal and result in a monomer which is capable of polymerization by free radical means. Substituents which donate electrons are also well known in the art and include, for example, —OR', where R' is any organic radical;

where $R_{30}$, $R_{31}$, and $R_{32}$ are selected from the group consisting of hydrogen and any organic radical. For example,

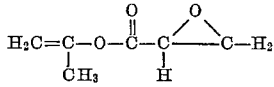

contains an electron donating group (—$CH_3$) and an electron withdrawing group

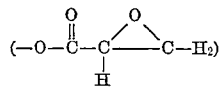

of about equal power on the beta-carbon atom. This compound is therefore unsuitable because the net effect is that there is no electron withdrawal from the double bond. In a similar manner, allyl glycidyl ether, i.e.,

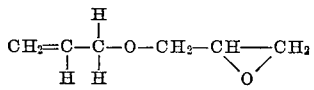

is not a suitable monooxirane compound for the compositions of this invention since the

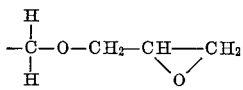

group donates electrons to the double bond. On the other hand, compounds having the general formula:

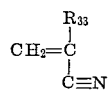

where $R_{33}$ is an alkyl group containing a single oxirane oxygen atom, readily polymerize even though $R_{33}$ is an electron donating group because —C≡N is such a strong electron withdrawal group that the net effect, i.e., the summation of the electron donating power of the $R_{33}$ group and the electron withdrawal power of the —C≡N group is that electrons tend to be withdrawn from the olefinic double bond, thus activating it for polymerization. As a further example, a compound such as:

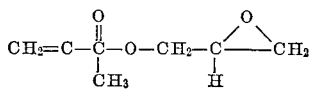

will readily polymerize even though the beta-carbon atom contains the electron donating methyl group, since again the electron withdrawal power of the

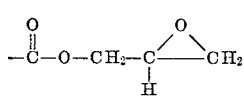

group is greater than the electron donating power of the $CH_3$ group.

The preferred monooxirane compounds are the alpha-olefinically unsaturated terminal monoepoxides represented by the general formula:

Formula XI

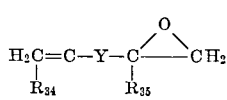

where $R_{35}$ is selected from the group consisting of hydrogen and a saturated hydrocarbon radical having between 1 and 10 carbon atoms; where $R_{34}$ is selected from the group consisting of hydrogen; halogen;

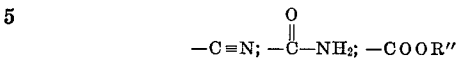

where R" is any saturated hydrocarbon radical having between 1 and 10 carbon atoms; and

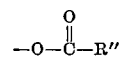

where R" is as defined when Y is selected from the group consisting of

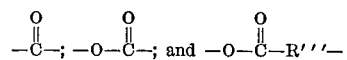

where R''' is any divalent hydrocarbon radical having between 1 and 20 carbon atoms; and where 34 is selected from the group consisting of a saturated hydrocarbon radical having between 1 and 10 carbon atoms; hydrogen; halogen;

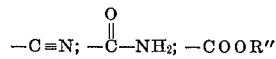

where R" is as defined; and

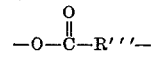

where R''' is as defined when

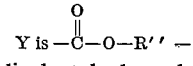

where R''' is any divalent hydrocarbon radical having between 1 and 20 carbon atoms.

In general, the total number of carbon atoms in the monooxirane compound is suitably between 4 and 30, and preferably between 4 and 10 carbon atoms per molecule. The total number of carbon atoms in the preferred monooxirane compound should be such that the compound is liquid at about room temperature. Examples of suitable compounds include, but are not limited to, glycidyl methacrylate;
glycidyl acrylate
glycidyl propacrylate;
2-methyl-3-keto-4,5-epoxy pentene-1;
2-cycano-3-keto-4,5-epoxy pentene-1;
3-keto-4-methyl-4,5-epoxy pentene-1;
3,4-epoxy butene-1;
3,4-epoxy-3-chloro butene-1;
3-keto-4,5-epoxy pentene-1;
epoxy ethyl propenoate

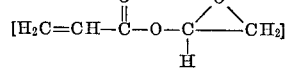

2-methyl-2,3-epoxy propyl acrylate;
2-decyl-2,3-epoxy propyl acrylate;
4-methyl-4,5-epoxy pentyl acrylate;
4-methyl-4,5-epoxy pentyl methyl acrylate;
2-methyl-2,3-epoxy propyl methyl acrylate;

vinyl 3,4-epoxy butanoate

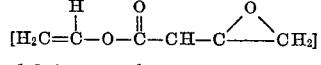

vinyl 3-methyl-3,4-epoxy butanoate; and vinyl 7,8-epoxy octonoate.

When the monoepoxide is unsaturated, that is, when the monoepoxide contains one or more olefinic double bonds, the unsaturation should, of course, be such that the unsaturated monoepoxide will not homopolymerize under the conditions of curing to form a di- or polyepoxide before the monoepoxide cross-links with the polyanhydride.

The solid polyanhydride compounds described above are, in another embodiment, dissolved in a liquid monooxirane compound containing as its only functional group a single oxirane oxygen atom, i.e., a liquid monoepoxide, to produce the new compositions of this invention. By a functional group is meant a group such as an oxirane oxygen atom which would participate in the anhydride-monoepoxide cross-linking reaction, i.e., combine chemically with the anhydride, such as for example, —OH, —SH, and —NH groups. One preferred class of saturated (i.e., containing no olefinic unsaturation) liquid organic monooxirane compounds can be represented by the general Formula XII below:

Formula XII

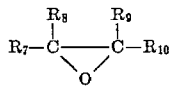

wherein $R_7$, $R_8$, and $R_9$ are selected from the group consisting of hydrogen, a hydrocarbon radical as defined above in connection with Formula II, a substituted hydrocarbon radical as defined above and —OR, where R is any hydrocarbon radical as defined above; and $R_{10}$ is selected from the group consisting of a hydrocarbon radical as defined above, a substituted hydrocarbon radical as defined above and —OR, where R is any hydrocarbon radical as defined above.

The total number of carbon atoms in the monoepoxide compound should be such that the compound is liquid at about room temperature. In general, the number of carbon atoms is suitably between 3 and about 20 and preferably between about 3 and 10 per molecule.

The preferred saturated oxirane compounds are the so-called terminal monoepoxides which are represented by the above Formula XII when $R_7$ and $R_8$ are hydrogen. When terminal epoxides are used, it is preferred that $R_{10}$ be selected from the group consisting of phenyl, —OR where R is as defined above, saturated aliphatic radicals having between 1 and 18 carbon atoms, and halogen substituted alkyl groups.

As noted above, the oxirane compound must be liquid at room temperature in order to dissolve the solid polyanhydride compounds defined above. Examples of suitable oxirane compounds include:

methyl glycidyl ether;
butyl glycidyl ether;
octylglycidyl ether;
phenyl glycidyl ether;
allyl glycidyl ether;
isopropyl glycidyl ether;
1,2-epoxy propane;
1,2-epoxy butane;
1,2-epoxy hexane;
1,2-epoxy decane;
1,2-epoxy-7-propyldecane;
1,2-epoxy-5-chlorododecane;
2,3-epoxy-2-phenylhexane;
1,2-epoxy-2-butoxypropane;
1,2-epoxy dodecane;
1,2-epoxy octadecane;
1,2-epoxy eicosane;
1,2-epoxy triacontane;
1,2-epoxy tetracontane;
glycidyl benzoate;
glycidyl acetate;
limonene oxide;
cyclohexene oxide;
7,8-epoxyhexadecane;
3,4-epoxyhexane;
1,2-epoxy-3-chlorobutane;
monoepoxidized soy bean oil 1,2-epoxy-2-phenoxypropane;
2,3-epoxy-2,3-dimethylbutane;
2-propyloctyl glycidyl ether;
3-methylpent-1-ene glycidyl ether;
1,2-epoxy-2-chloropropane (epichlorohydrin);
2,3-epoxy-2,4-dimethyl-4-chlorobutane;
1,2-epoxy-3-bromopropane (epibromohydrin);
monoepoxidized 2-ethylhexyl tallate; and
glycidyl-para-methylbenzoate.

The most preferred oxirane compounds are styrene oxide, epichlorohydrin, 1,2-epoxy-2-phenoxypropane, 1,2-epoxy-2-butoxypropane, and epoxidized straight chain alpha monoolefins having between 3 and 20 carbon atoms per molecule such as 1,2-epoxypropane, 1,2-epoxybutane and 1,2-epoxyoctane, 1,2-epoxydodecane, and 1,2-epoxyeicosane.

The composition of this invention also comprises a cyclic monoanhydride compounds may be represented by the ing from 4 to 5 carbon atoms in the ring. The preferred monoanhydried compounds may be represented by the formula Formula XIII

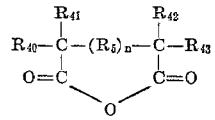

wherein the radicals $R_{40}$, $R_{41}$, $R_{42}$, and $R_{43}$ are, independently, hydrogen, halogen, hydrocarbon or substituted hydrocarbon radicals, the radical $R_5$ is —$CH_2$— and $n$ is zero or 1, with the proviso that at least one of said radicals comprises one or more carbon atoms. One embodiment is that in which the radicals comprise one having a carbocyclic nucleus. Thus, the radicals $R_{41}$ and $R_{42}$, together with the carbon atoms of the succinic anhydride nucleus to which they are attached, may form a carbocyclic nucleus, such as one comprising six carbon atoms. The basic criterion for selecting the monoanhydride is that it be soluble in the resin-forming solution. Further, it should not react with other materials in the solution prior to the polymerization reaction in such a way as to effect decomposition of any ingredient, and it should be relatively nonvolatile. Apart from these criteria, practically any cyclic monoanhydride of a dicarboxylic acid having 5 or more carbon atoms and having from 4 to 5 carbon atoms in the anhydride ring is useful according to the invention.

By the term "hydrocarbon radical" as used here is meant any group of atoms consisting of carbon and hydrogen, such as alkyl, preferably saturated, having from 1 to about 20 or more carbon atoms, cycloalkyl, preferably saturated, having from 4 to about 20 or more carbon atoms, and aryl, alkaryl, and aralkyl having from 6 to about 30 or more carbon atoms. By the term "substituted hydrocarbon radical" is meant hydrocarbon radicals as defined above, but where one or more atoms therein have been exchanged for a halogen; —C≡N; —OR group where R is any hydrocarbon radical as defined above; or

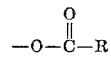

where R is any hydrocarbon radical as defined above. Examples of such radicals are given elsewhere in the specification. Examples of suitable monoanhydrides having the above formula are as follows:

methylsuccinic anhydride;
phenylsuccinic anhydride;
pentadecylsuccinic anhydride;
diphenylsuccinic anhydride;
naphthylsuccinic anhydride;
orthotolylsuccinic anhydride;
propylsuccinic anhydride;
hexylsuccinic anhydride;

eicosanylsuccinic anhydride;
dodecylsuccinic acid anhydride;
glutaric anhydride;
cyanoethylsuccinic anhydride;
docosylsuccinic anhydride;
butylsuccinic anhydride;
1,8-naphthalic anhydride;
dioctylsuccinic anhydride;
4-propyl-8-methyl-icosylsuccinic anhydride;
1-bromo-2-heptylsuccinic anhydride;
1-bromo-2-phenylsuccinic anhydride;
1,2-dicarboxyliccyclopentane anhydride;
1,2-dicarboxyliccycloheptane anhydride;
chloromethylsuccinic anhydride;
1,2-dicarboxylic-4-chlorocyclopentane anhydride;
1,2-dicarboxylic-4-octylcyclohexane anhydride;
1,2-dicarboxylic-5-cyanocyclohexane anhydride;
1,2-dicarboxylic-4(2-chloropentyl)-cyclohexane anhydride;
bicyclo(2.2.1)-heptane-2,3-dicarboxylic anhydride;
7-oxabicyclo(2.2.1)-heptane-2,4-dicarboxylic anhydride;
cyclohexane-1,2-dicarboxylic anhydride;
bicyclo(2.2.2)-octane-4,5-dicarboxylic anhydride;
α,α-dimethylbenzylsuccinic anhydride (cumylsuccinic anhydride);
phthalic anhydride;
4-endomethylenetetrahydrophthalic anhydride;
methylbicyclo(2.2.1)heptene-2,3-dicarboxylic anhydride (nadic methyl anhydride);
octadecylsuccinic acid anhydride;
3-methoxy-1,2,3,6-tetrahydrophthalic acid anhydride; or mixtures thereof.

The prime criteria for the compositions of this invention is the solubility of the solid polyanhydride and of the monoanhydride in the liquid monoepoxide to form a solution which is liquid at about room temperature, i.e., at temperatures between about 10° and 30° C. A solution is required in order to obtain a hard, infusible resin which is clear, non-grainy and has excellent solvent resistance properties together with good flexural strength and heat distortion temperatures. The time for solution of the polyanhydride in the monoepoxide varies depending on the ratio of the materials in the mixture, the temperature and, of course, the nature of the materials themselves. Thus, while the polyanhydride to epoxide ratio (A/E ratio) in the final mixture can vary between about 1 to 10 and 5 to 1, faster solution of the polyanhydride will occur at the lower A/E ratios. More will be said of this A/E ratio below. In addition, it is sometimes desirable to heat the monoepoxide, the monoanhydride and the polyanhydride to effect a faster solution. Since the use of increased temperatures promotes crosslinking and solidification, the temperatures during this premixing are suitably maintained below about 90° C. and preferably between 50° and 60° C. In any event, the solution on cooling to room temperature would still be liquid.

As noted above, the compositions of this invention are liquid solutions of the defined polyanhydride and the defined monoanhydride in the define monoepoxie at room temperature, i.e., at temperatures between about 10° and 30° C. If these solutions were left to stand long enough, they would cross-link to form a hard, infusible resin. Fortunately, the rate of solution of the defined mono- and poly- anhydrides is faster than the rate of cross-linking at the solution temperatures defined above. That the polyanhydride should cross-link at all using the monoepoxide as a cross-linking agent was surprising. This is so because all polyanhydrides will not react to form hard infusible resins using a monoepoxide as the cross-linking agent. For example, pyromellitic dianhydride (PMDA), a commercially available dianhydride will not react using a monoepoxide as the sole cross-linking agent to form a clear, nongrainy hard infusible resin. PMDA and other similar polyanhydrides will apparently not work because they are substantially insoluble in the liquid monoepoxides. It is critical therefore that the defined polyanhydrides be soluble in the defined liquid monoepoxides at about room temperature to form a liquid solution if a clear, non-grainy finished resin is to be obtained.

It has been found that when straight chain alpha olefins are employed to prepare the monomeric oxirane compound (monoepoxide) by epoxidation and the solid polyanhydrides are prepared by the copolymerization of maleic anhydride and straight chain alpha olefins, the size of the straight chain alpha olefins used in preparing the monoepoxide and polyanhydride becomes important in order for the monoepoxide to solubilize the polyanhydride. In general, the solubility of maleic anhydride-alpha olefin copolymers increases as the carbon number of the alpha olefin increases. In addition, the solvent power or ability of the monoepoxide to solubilize the polyanhydride decreases as the carbon number of the alpha olefins used to prepare the monoepoxide increases. For example, propylene oxide and butylene oxide appear to be suitable solvents for substantially any maleic anhydride alphaolefin copolymer. On the other hand, when the monoepoxide is prepared by the oxidation of a straight chain alpha olefin having eight carbon atoms or more per molecule, the straight chain alpha olefin used to prepare the polyanhydride must have at least eight carbon atoms per molecule. In any event, in order to form the compositions of this invention the monoanhydride and the polyanhydride must be substantially completely dissolved in the liquid monomeric oxirane compound to form a liquid solution at about room temperature before solidification of a mixture of the anhydrides and monoepoxide.

The ratio of the polyanhydride to monoepoxide compound to employ in the compositions of this invention can vary over a wide range. The specific ratio to employ with any given polyanhydride or monoepoxide is determined, first of all, by whether a liquid solution of the polyanhydride in the monoepoxide is obtained at room temperature. The liquid solution of polyanhydride in the monoepoxide hardens by a crosslinking reaction, and the reaction product is a network of ester and ether linkages having substantially no carboxylic acid group therein. The ester linkages are believed to form through the interaction of the anhydride and epoxide groups while the ether linkages are believed to form through the interaction of several epoxide groups. Where the liquid organic monomeric oxirane compound contains only one oxirane oxygen atom as its only functional group, one equivalent of the monooxirane compound is equivalent to one mole.

The anhydride equivalent of the polyanhydride is defined as the average number of anhydride groups per molecule. In order to form thermosetting compositions, the polyanhydride must have an anhydride equivalency of at least two, that is, the polyanhydride must have at least two anhydride groups per molecule. The polyanhydride group to epoxide group ratio, known more simply as the A/E ratio, can therefore vary between about 0.1:1 and 5:1, but is preferably between about 0.3:1 and about 2:1, more preferably between 0.5:1 and 1.5:1, for the best physical and chemical properties.

As used herein, the A/E ratio refers only to the ratio of the anhydride/epoxide groups of the polyanhydride and the monooxirane compound, unless otherwise so specified. The amount of monoanhydride is based on the total weight of the epoxide, polyanhydride, and monoanhydride (excluding the weight of the cure accelerator), unless otherwise specified. This quantity of monoanhydride is between about 5% and 25%, more preferably between about 8% and 15%. The upper limit of a given monoanhydride depends on its solubility, which is also related to the temperature. For example, with phthalic anhydride epichlorohydrin, and a copolymer of maleic anhydride and hexene-1, when 20% of the monoanhydride is utilized and the resin is cured at room temperature, undissolved monoanhydride may appear in the product. With the same composition, when curing temperature is 80° C., all of the phthalic anhydride is dissolved. Another useful procedure for improving solubility is to utilize an additional amount of the monoepoxy compound over that required to give the desired $A/E$ ratio of polyanhydride to epoxide.

One of the features of the liquid compositions of this invention is that they can be crosslinked or cured at relatively low temperatures and pressures. A hardening or curing of the resins can suitably be effected at a temperature between about 0° C. and 110° C. at atmospheric pressure. Higher pressures can be used if desired, but provide no additional benefits. Higher curing temperatures, for example up to 200° C. or more can be used, but higher temperatures promote evaporation of one or the other of the components of the composition resulting in undesirable bubble formation or other difficulties. The preferred curing temperatures are between 50° C. and 100° C. Curing may take place in two stages, a first stage at a low temperature, and a second stage at a higher temperature.

The time for curing or hardening of the liquid compositions of this invention will vary over a wide range, depending on the reactivity of the particular monoepoxides, monoanhydrides, and polyanhydrides employed. The solution of the anhydrides in the monoepoxide, in general, will not cure at room temperature over reasonable lengths of time of say one to 24 hours. Either higher curing temperatures, as defined above, must be employed or an accelerator, as defined below can be employed to increase the rate of curing.

It has been found that the curing or crosslinking reaction can be accelerated by the use of various materials. Several Friedel-Crafts type salts, such as ferric chloride and lithium chloride, while accelerating the production of a solid product, are undesirable in that they are insoluble in the polyanhydride-monoepoxide system and, in addition, result in a solid which is softer than desired. Other materials, such as $BF_3$ complexes, salts of tertiary amines, picolinic acid and concentrated $NH_4OH$, while soluble in the monoepoxide system are undesirable in that the cured products are softer than desired.

Primary and secondary amines, concentrated HCl, NaOH and oxalic acid either do not function at all as accelerators or react with a polyanhydride-monoepoxide to form undesirable products.

It has been found that soluble tertiary amines as a class are unique in accelerating the curing of the compositions of this invention to solids of desired hardness. One suitable class of tertiary amines can be represented by the general formula:

Formula XV

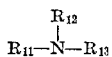

where $R_{11}$, $R_{12}$, and $R_{13}$ can be the same or different and can be selected from the group consisting of a hydrocarbon radical as defined above having between 1 and 37 carbon atoms, and a substituted hydrocarbon radical as defined above having between 1 and 37 carbon atoms; and wherein the sum of the carbon atoms in $R_{11}$, $R_{12}$, and $R_{13}$ includes both saturated and unsaturated groups. Examples of suitable tertiary amines having the above Formula XV include:

trimethylamine;
triethylamine;
N,N-dimethylaniline;
N,N-diethylallylamine;
N,N-di-n-propylaniline;
N,N-diethyl-o-toluidine;
tri-n-hexylamine;
tri-n-heptylamine;
tri-n-phenylamine;
tri-n-decylamine;
N,N-diethylaniline;
tri-n-butylamine;
tri-pentylamine;
tridodecylamine;
N,N-dimethylbenzylamine;
dimethylaminomethylphenol;
N,N-diethyl-1-naphthylamine;
p-bromo-N,N-dimethylaniline;
p-bromo-N,N-diethylaniline;
p-chloro-N,N-diethylaniline;
N,N-diethyl-p-toluidine;
N-ethyl-N-methylaniline;
N,N-dimethyl-m-toluidine;
N,N-diethyl-m-toluidine;
tri-n-propylamine;
tri-isopentylamine;
trioctylamine;
N,N-diphenylmethylamine;
meta-diethylaminophenol;
N,N-dimethyloctadecylamine;
N,N-dimethylcyclohexylamine;
N-methyl-N-phenylbenzylamine;
tridimethylaminomethylphenol;
N,N-dimethyl-1-naphthylamine;
alpha-methylbenzyldimethylamine;
N,N-dimethyl-p-nitrosoaniline;
dimethylaminoethyl methacrylate;
N,N-diethyl-2,5-dimethylaniline;
N,N-diethyl-2,4-dimethylaniline;
N,N-alpha-trimethylbenzylamine;
N,benzyl-N-ethyl-m-toluidine; and
N,N-dimethyl-2-ethylhexylamine.

Pyridines are also suitable as accelerators and can be represented by Formula XVI below:

Formula XVI

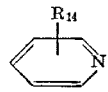

where $R_{14}$ can be selected from the group consisting of hydrogen, a hydrocarbon radical as defined above having between 1 and 10 carbon atoms, and a substituted hydrocarbon radical as defined above having between 1 and 10 carbon atoms; and wherein the term "alkyl" includes both saturated and unsaturated groups. Examples of suitable tertiary amines having the above Formula XVI include:

pyridine;
3-ethylpyridine;
2-benzylpyridine;
4-phenylpyridine;
3-chloropyridine;
2-allylpyridine;
4-ethylpyridine;
2-isopropylpyridine;
3-bromopyridine;
vinylpyridine; and
3-picoline While the monosubstituted pyridines are preferred, the more highly substituted pyridines can also be employed, such as for example:

3,5-dicyanopyridine;
3,5-dimethylpyridine;
3-cyano-4-methylpyridine; and
2,4,6-trimethylpyridine.

Examples of other suitable tertiary amines include:

quinazoline;
triethylene diamine;
quinoxaline;
naphthyridine;
phthalazine;
phenotriazine;
acridine;
N,N-dimethyl-m-nitroaniline;
N,N-diethyl-m-phenetidine;

N,N-diethyl-o-nitroaniline;
pyrido[3,2-b]pyridine;
pyrido[4,3-b]pyridine;
1,2,4-benzotriazine;
phenazine;
N,N-diethyl-3,4-dinitroaniline;
N,N,N',N'-tetramethylmethylene diamine;
N,N,N',N'-tetramethyl-1,3-butane diamine; and
N,N,N',N'-tetraethylethylene diamine.

The amount of the tertiary amine accelerator to employ is not critical, amounts on the order of about 0.1 and 20 parts of amine catalyst per 100 parts of monoanhydride - polyanhydride-monoepoxide solution being satisfactory. The preferred range of accelerator concentration is 0.5 and 5 parts of amine catalyst per 100 parts of anhydride-monoepoxide solution. The more amine catalyst that is used, the faster the rate of cure, and the curing is an exothermic reaction. When the higher concentration of amine is employed, it is preferred that means also be employed to remove the exothermic heat of reaction to avoid any possible charring of the product. For example, one suitable method to remove the heat of the curing reaction more quickly is to form the reaction mixture into a film.

The use of a tertiary amine accelerator and particularly the use of the alkyl substituted anilines and pyridines results in much faster cures.

The method of addition of the tertiary amine accelerators is critical. They must be added to the mixture of anhydrides and monoepoxide after the anhydrides are dissolved in the monoepoxide, since it normally takes longer for the solution of the anhydrides in the monoepoxide than for the amine accelerators to harden the mixture. Consequently, if the amine is added first to the monoepoxide and the anhydrides added to this mixture, the composition may harden before all of the anhydrides are dissolved, and a grainy composition with inferior chemical and physical properties will result.

This invention will be further described with relation to the specific examples to be given below.

In many of the examples to follow, the polyanhydride compound was prepared by the copolymerization of maleic anhydride and an alpha olefin having between 3 and 26 carbon atoms per molecule. These copolymers were prepared by reacting the desired olefin and maleic anhydride in a molar ratio of 2:1 in the liquid phase in the presence of a mutual solvent at a temperature between 60° and 100° C. using as a catalyst between 2 and 3 weight percent of benzoyl peroxide based on the maleic anhydride. The copolymer was then (1) separated from the solvent and any residual catalyst, and (2) dried. Infrared analysis and nuclear magnetic resonance data show the hexene-1 and maleic anhydride combine in a 1:1 ratio. The inherent viscosities of the copolymers measured by dissolving the copolymer in the ratio of 5 grams to a deciliter of acetone, measured at 77° F. was between 0.04 and 1.15 as used in the examples below. Heat distortion temperature (HDT) was measured by ASTM test D-648-56. Unless otherwise specified, the coatings were 3 mils thick.

EXAMPLE 1

Epichlorohydrin in the amount of 8.1 grams is utilized to dissolve 8 grams of hexene-1-maleic anhydride copolymer and phthalic anhydride is dissolved in the resulting liquid in varying amounts. A curing accelerator, in the form of 3-picoline, in the amount of about 3%, based on the weight of the solution, is added to the solution and the resin is thoroughly blended. The solution is then poured into test bar molds and cured for 24 hours at 80° C. The bars, in inches, were ½×5×⅛ for the impact and heat distortion temperature tests, 1×3×⅛ for the flexural strength tests, and ¾×6×⅛ for the tensile strength tests. The results are shown in Table I. The $A/E$ ratio (polyanhydride to epoxy compound) is 0.5.

TABLE I

| | Wt. percent PA | Flexural, p.s.i. | Impact [1] | Heat distortion Temp., °C. | Hardness, Barcol 935 | Wt. percent loss |
|---|---|---|---|---|---|---|
| 1 | 1 | 3,885 | 0.202 | 54 | 53 | 1.6 |
| 2 | 3 | 3,110 | 0.192 | 52 | 56 | 2.2 |
| 3 | 5 | 2,005 | 0.186 | 52 | 55 | 1.4 |
| 4 | 20 | 6,320 | 0.370 | 50 | 62 | 0.8 |
| 5 | 0 | 894 | 0.189 | 66 | 63 | 11.4 |

[1] Ft.-lbs./in. of notch.

The high loss in run 5 is attributed to volatilization of epichlorohydrin. When the cure is conducted at room temperature, less than 20% by weight of phthalic anhydride must be used, as evidences of insolubility of such an amount appears.

EXAMPLE 2

The procedure is the same as for Example 1 with the exception that an additional amount of epichlorohydrin, equivalent on a molar basis to the phthalic anhydride added is included. The results are shown in Table II.

TABLE II

| | Wt. percent PA | Flexural, p.s.i. | Impact [1] | Heat distortion Temp., °C. | Hardness, Barcol 935 | Wt. percent loss |
|---|---|---|---|---|---|---|
| 1 | 1 | 6,710 | 0.251 | 58 | 53 | 3.5 |
| 2 | 3 | 5,470 | 0.224 | 54 | 55 | 1.3 |
| 3 | 5 | 1,940 | 0.254 | 53 | 53 | 1.7 |
| 4 | 20 | 4,750 | 0.218 | 48 | 57 | 0.6 |

[1] Ft.-lbs./in. of notch.

An additional quantity of epichlorohydrin over that required to give an $A/E$ ratio of 0.5 is beneficial when curing at room temperature for the reason that higher proportions of the monoanhydride are soluble in the solution.

EXAMPLE 3

In this example curing is conducted at room temperature. Succinic anhydride is used in runs 1 and 2 and phthalic anhydride in run 3. In the second run, an additional amount of succinic anhydride on an equivalence basis is used. In neither instance is the succinic anhydride soluble in the liquid, thus giving a grainy product. The results appear in Table III.

TABLE III

| | Wt. percent Anhydride | Flexural, p.s.i. | Impact [1] | Heat distortion temp., °C. | Hardness, Barcol 935 | Wt. percent loss |
|---|---|---|---|---|---|---|
| 1 | [2] 10 | 1,480 | 0.167 | 44 | 53 | 0.8 |
| 2 | [2] 10 | 1,062 | 0.189 | 43 | 28 | 0.6 |
| 3 | 10 | 4,335 | 0.441 | 52 | 53 | 0.5 |

[1] Ft.-lbs./in. of notch.
[2] Succinic anhydride insoluble.
NOTE.—Succinic anhydride reduces weight percent loss, but is undesirable as it gives a grainy product (insoluble).

EXAMPLE 4

The polyanhydride in the form of a hexene-1-maleic anhydride copolymer is dissolved in epichlorohydrin in proportions to give an $A/E$ ratio of 0.5. About 5% of ratio of 3-picoline is dissolved therein. The solution is coated on an aluminum substrate in coatings 1 mil, 2 mils. and 3 mils in thickness and cured at room temperature for 24 hours. The coating is severely etched and is lifted from the substrate in places.

EXAMPLE 5

To the same solution of maleic anhydride hexene copolymer and epichlorohydrin as in Example 4 is added 10% phthalic anhydride and 3% 3-picoline is dissolved therein. The resin solution is coated on glass as a film 1 mil in thickness and cured for 24 hours at room temperature. The resulting film is clear, smooth and has a pencil hardness of H.

EXAMPLE 6

When an amount of epichlorohydrin equivalent to the amount of phthalic anhydride is added to the solution, the procedure otherwise being identical to Example 5, the result is identical in that a clear, smooth, film 1 mil in thickness having a pencil hardness of H is obtained.

EXAMPLE 7

When 10% succinic anhydride is substituted for the phthalic anhydride of Example 5, the film is cloudy and rough. Some improvement is obtained by including an equivalent amount of epichlorohydrin, but the film is somewhat cloudy. In both cases the film has a pencil hardness of H. This example indicates that succinic anhydride is unsatisfactory because of poor solubility in the solution.

EXAMPLE 8

The procedure of Example 5 is followed, but varying the amounts of phthalic anhydride with the following results:

TABLE IV

| Phthalic anhydride, percent by wt. | Curing temp., °C. | Substrate | Pencil hardness | Coatings characteristics |
|---|---|---|---|---|
| 1 | 22 | Glass | | Severe etching and lifting. |
| 1 | 80 | do | | Do. |
| 1 | 22 | Aluminum | | Do. |
| 3 | 22 | Glass | | Do. |
| 3 | 80 | do | | Do. |
| 3 | 22 | Aluminum | | Do. |
| 5 | 22 | Glass | | Do. |
| 5 | 80 | do | | Do. |
| 5 | 22 | Aluminum | | Do. |
| 20 | 22 | Glass | H | Clear, smooth with patches. |
| 20 | 80 | do | H | Do. |
| 20 | 22 | Aluminum | | Do. |

The foregoing results indicate that a concentration of 20% phthalic anhydride is useful to give an excellent film when a sufficiently high curing temperature is used to insure compatibility.

EXAMPLE 9

The procedure of this example is identical to that of Example 8 with the exception that an additional amount of epichlorohydrin equivalent to the amount of phthalic anhydride is included. The results are as follows:

TABLE V

| Phthalic anhydride, percent by wt. | Curing temp., °C. | Substrate | Pencil hardness | Coating characteristics |
|---|---|---|---|---|
| 1 | 22 | Glass | | Severe etching with some lifting. |
| 1 | 80 | do | | Do. |
| 1 | 22 | Aluminum | | Do. |
| 3 | 22 | Glass | | Severe etching, no lifting. |
| 3 | 80 | do | | Do. |
| 3 | 22 | Aluminum | | Do. |
| 5 | 22 | Glass | | Severe etching |
| 5 | 80 | do | H | Clear and smooth. |
| 5 | 22 | Aluminum | | Severe etching no lifting. |
| 20 | 22 | Glass | H | Clear smooth with patches |
| 20 | 80 | do | H | Do. |
| 20 | 22 | Aluminum | | Not clear, all white. |

EXAMPLE 10

As has been indicated heretofore, it is essential that the polyanhydride be derived from a straight chain olefin and an unsaturated anhydride. This is shown by the following. A diisobutylene-maleic anhydride copolymer is dissolved in epichlorohydrin to give an $A/E$ ratio 0.5. Phthalic anhydride in the amount of 10% is then dissolved therein and 0.5% 3-picoline is thoroughly mixed therewith. A layer 1 mil thick is coated on glass and the coating cured at 80° C. for 4 hours. The solution is also coated in the same thickness on aluminum and cured at room temperature for 24 hours. The coatings in each case were severely etched and a substantial amount of lifting of the film occurred. This indicates that branched chain olefins are not suitable.

EXAMPLE 11

When Nadic methyl anhydride in the amount of 10% is used in place of phthalic anhydride following the procedure of Example 5 excellent results are obtained. A 1 mil film on glass cured at 80° C. provides a very clear and smooth coating. When the same composition is coated on aluminum and cured at room temperature the coating is clear and smooth. The pencil hardness of the coating cured at 80° C. is H.

EXAMPLE 12

Pyromellitic dianhydride is an aromatic dianhydride excluded from the invention because of ineffectiveness. Utilizing pyromellitic dianhydride in the amount of 5% in place of the phthalic anhydride of Example 5, when cured at 80° C. on glass, provides a hazy, rough coating with etching. When cured at room temperature the coating is also hazy with etch and some lifting.

EXAMPLE 13

A polyanhydride consisting of the copolymer of maleic anhydride and gasoline dissolved in epichlorohydrin with an $A/E$ ratio of 0.5 is combined with 10% of phthalic anhydride and 5% 3-picoline to obtain a homogeneous solution. This solution when coated on glass and cured at 80° C. forms a clear, smooth film. The pencil hardness is H. When the same material is coated on aluminum and cured at room temperature the clear, smooth film is flexible enough so that the aluminum may be bent to have a diameter of the bend of ⅛ inch without cracking or lifting from the aluminum substrate. The sward hardness of the coating on glass is 67.

EXAMPLE 14

When α,α-dimethylbenzylsuccinic anhydride is substituted for the phthalic anhydride of Example 5 and a 1 mil coating is placed on glass and cured at 80° C. a clear, smooth film is obtained as is also the case when the coating is on aluminum and room temperature is utilized to cure the resin.

EXAMPLE 15

When Example 11 is repeated, but using coatings 2 mils and 3 mils in thickness on aluminum and a room temperature cure, the films are clear and smooth with no etch or lift.

EXAMPLE 16

Example 11 is repeated with the additional modifications of the use of acetone as a solvent in formulating the coating solution, and varying the $A/E$ ratios. The maleic anhydride-hexene copolymer had a dilute solution viscosity (acetone, 77° F.) of 0.119 dl./g. The Nadic methyl anhydride is used in the amount of 5% based on epichlorohydrin, rather than on the weight of the total solution. The conditions and results are as follows:

TABLE VI

| $A/E$ | Acetone, percent by weight of solution | Curing temp., °C. | Substrate | Curing characteristics |
|---|---|---|---|---|
| 0.5 | 3 | 80 | Glass | Clear and smooth. |
| 0.5 | 3 | Room | Aluminum | Do. |
| 0.75 | 12 | 80 | Glass | Do. |
| 0.75 | 12 | Room | Aluminum | Do. |
| 1.0 | 18 | 80 | Glass | Do. |
| 1.0 | 18 | Room | Aluminum | Do. |
| 1.25 | 24 | 80 | Glass | Do. |
| 1.25 | 24 | Room | Aluminum | Clear, some etch. |
| 1.5 | 30 | 80 | Glass | Clear and smooth, no etch or lift. |
| 1.5 | 30 | Room | Aluminum | Clear, some etch. |

The results suggest that solvents in large amount and/or higher $A/E$ ratios require higher curing temperatures.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A new composition capable of being cured to a solid resin comprising a spreadable solution of:
   (A) a solid polyanhydride compound containing at least two succinic anhydride groups and less than three conjugated double bonds when one of the conjugated double bonds is between the carbon atoms alpha to the carbonyl groups in a succinic anhydride group;
   (B) a monoxirane compound selected from the group consisting of:
      (1) a liquid monoxirane compound containing as its only functional group a single oxirane oxygen atom and having the general formula

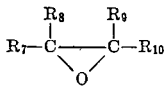

wherein $R_7$, $R_8$, $R_9$ are selected from the group consisting of hydrogen, a hydrocarbon radical, a substituted hydrocarbon radical or —OR, where R is a hydrocarbon radical and $R_{10}$ is selected from the group consisting of a hydrocarbon radical, a substituted hydrocarbon radical and —OR, where R is a hydrocarbon radical; and
      (2) a liquid alpha-olefinically unsaturated monooxirane compound containing as its only functional groups a single oxirane oxygen atom and said olefinic double bond and which contains substituents directly connected to the beta-carbon atom of the olefinic double bond, which substituents activate the alpha-olefin double bond for polymerization by free-radical means; and
   (C) a cyclic-monoanhydride of a dicarboxylic acid having at least 5 carbon atoms and having from 4 to 5 carbon atoms in the anhydride ring and having the formula

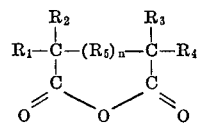

wherein the radicals $R_1$, $R_2$, $R_3$, and $R_4$ are hydrogen, halogen, hydrocarbon radicals, or substituted hydrocarbon radicals, $R_5$ is —$CH_2$— and $n$ is 0 or 1, with the proviso that at least one of said radicals comprises one or more carbon atoms; and wherein the ratio of (A) to (B) is between about 0.1 to 1 and 5 to 1, with component (C) being present in an amount of between 5 percent and 25 percent by weight of the solution.

2. The composition of claim 1 in which the polyanhydride is a copolymer of a straight chain mono-α-olefin having from about 6 to about 14 carbon atoms.

3. The composition of claim 1 in which said oxirane compound is saturated, and said composition comprises a tertiary amine cure accelerator in solution.

4. The composition of claim 1 in which said oxirane compound is unsaturated, and said composition comprises a tertiary amine during acceleration.

5. The composition of claim 1 in which $n$ is O and $R_2$ and $R_3$ jointly form a carbocyclic structure with the carbon atoms of the succinic anhydride nucleus to which they are attached.

6. The composition of claim 5 in which the ratio of (A) to (B) is between about 0.1 to 1 and about 2 to 1, with the monoanhydride (C) being present in an amount of between about 5% and 25% by weight of said solution.

7. An article of manufacture comprising a solid resin prepared from the composition of claim 1.

References Cited

UNITED STATES PATENTS

| | | | |
|---|---|---|---|
| 3,207,816 | 9/1965 | Dugliss et al. | 260—866 |
| 3,288,751 | 11/1966 | Porret et al. | 260—47 |
| 3,375,301 | 3/1968 | Case et al. | 260—869 |
| 3,374,209 | 3/1968 | Hat et al. | 260—78.4 |
| 3,453,246 | 7/1969 | Heilman | 260—78.5 |

JOSEPH L. SCHOFER, Primary Examiner

S. M. LEVIN, Assistant Examiner

U.S. Cl. X.R.

117—123D, 132BE; 260—878R

PO-1050
(5/69)

UNITED STATES PATENT OFFICE
CERTIFICATE OF CORRECTION

Patent No. 3,579,487                                  Dated May 18, 1971

Inventor(s) Stanley M. Hazen and William J. Heilman

It is certified that error appears in the above-identified patent and that said Letters Patent are hereby corrected as shown below:

Col. 2, line 26, that part of the formula which reads:

- $CH_2 - \underset{|}{CH} - \underset{|}{CH} - \underset{|}{C} -$   should read   - $CH_2 - \underset{|}{CH} - \underset{|}{CH} - \underset{|}{CH} -$ Col. 5, line 51, "(2,2.1)" should be --(2.2.1)--.

Col. 7, lines 5-10, that part of the formula which reads:

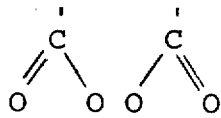   should read   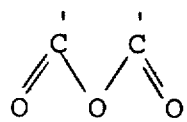

Col. 10, lines 31-32, the statement which reads:

$$Y \text{ is } -\overset{\overset{O}{\|}}{C} - O - R" -$$
should read
$$Y \text{ is } -\overset{\overset{O}{\|}}{C} - O - R'''$$

Col. 10, line 47, "2-cycano" should read --2-cyano--.

Col. 12, lines 17-22, the sentence which reads:

"The composition of this invention also comprises a cyclic monoanhydride compounds may be represented by the ing from 4 to 5 carbon atoms in the ring."

should read

--The composition of this invention also comprises a cyclic monoanhydride having at least five carbon atoms and having from 4 to 5 carbon atoms in the ring.--

Col. 12, line 21, "monoanhydried" should be --monoanhydride--.
Col. 13, line 21, "7-oxabicyclo(2.2.1)-heptane-2,4-dicarboxylic anhydride;"

should read

--7-oxabicyclo(2.2.1)-heptane-2,3-dicarboxylic anhydride;--

(Continued on page 2)

PO-1050
(5/69)

UNITED STATES PATENT OFFICE
CERTIFICATE OF CORRECTION

Patent No. 3,579,487                    Dated May 18, 1971

Inventor(s) Stanley M. Hazen and William J. Heilman

It is certified that error appears in the above-identified patent and that said Letters Patent are hereby corrected as shown below:

Page 2

Col. 13, line 60, "define monoepoxie" should be --defined monoepoxide--.

Col. 14, line 42, "group" should be --groups--.

Col. 16, line 55, "3-chloropyridine" should be --2-chloropyridine--

Col. 18, lines 61 and 62, "About 5% of ratio of 3-picoline . . ." should read --About 5% of 3-picoline . . .--

Col. 19, line 74, "4 hours" should read --24 hours--.

Col. 21, line 36, "a substituted hydrocarbon radical or -OR," should read --a substituted hydrocarbon radical and -OR,--.

Col. 22, line 43, "Hat et al." should be --Hay et al.--

Signed and sealed this 11th day of January 1972.

(SEAL)
Attest:

EDWARD M. FLETCHER, JR.
Attesting Officer

ROBERT GOTTSCHALK
Acting Commissioner of Patents